United States Patent
Ryan et al.

(10) Patent No.: US 10,798,880 B2
(45) Date of Patent: Oct. 13, 2020

(54) PLANTER WITH ELEVATED INTERNAL PORTION AND WATER PRESERVATION FEATURES

(71) Applicant: Classic Home & Garden, LLC, Monroe, CT (US)

(72) Inventors: Fred Joseph Ryan, Newton, CT (US); Timothy Joseph Nealon, Stratford, CT (US); Wendy Dubner Master, Mamaroneck, NY (US)

(73) Assignee: CLASSIC HOME & GARDEN, LLC, Monroe, CT (US)

( * ) Notice: Subject to any disclaimer, the term of this patent is extended or adjusted under 35 U.S.C. 154(b) by 177 days.

(21) Appl. No.: 15/485,936

(22) Filed: Apr. 12, 2017

(65) Prior Publication Data

US 2017/0295728 A1   Oct. 19, 2017

Related U.S. Application Data

(60) Provisional application No. 62/324,051, filed on Apr. 18, 2016.

(51) Int. Cl.
*A01G 9/02* (2018.01)
*A01G 9/04* (2006.01)

(52) U.S. Cl.
CPC ........ *A01G 9/02* (2013.01); *A01G 9/04* (2013.01)

(58) Field of Classification Search
CPC .. A01G 9/02; A01G 9/04; A01G 27/02; A01G 9/042; A01G 9/028; A01G 9/029; A01G 9/0291; A01G 9/047
USPC ............................................ 47/39, 71
See application file for complete search history.

(56) References Cited

U.S. PATENT DOCUMENTS

| | | | | |
|---|---|---|---|---|
| 75,555 A * | 3/1868 | Lilley | A01G 9/04 47/71 |
| 129,451 A * | 7/1872 | Baldwin | A01G 27/02 47/79 |
| 231,086 A * | 8/1880 | Pimley | A47G 7/047 47/67 |
| 357,698 A * | 2/1887 | Burrough | A01G 9/04 47/71 |
| 910,905 A * | 1/1909 | Clements | A01G 27/04 47/80 |
| 1,383,368 A * | 7/1921 | Ambrose | A01G 27/02 47/79 |
| 1,775,831 A * | 9/1930 | Salisbury | A01G 9/021 47/65.5 |
| 1,928,799 A * | 10/1933 | Stevens | A01G 9/023 47/39 |
| 3,220,144 A * | 11/1965 | Green | A01G 27/06 47/80 |
| 3,631,627 A * | 1/1972 | Van Zijverden | A01G 9/02 47/66.2 |
| 3,800,471 A * | 4/1974 | Adams | A01G 27/00 206/423 |

(Continued)

FOREIGN PATENT DOCUMENTS

GB        1200457 A  *  7/1970  ........... A01G 9/04

*Primary Examiner* — Christopher D Hutchens
(74) *Attorney, Agent, or Firm* — Tutunjian & Bitetto, P.C.

(57) ABSTRACT

A planter includes an interior surface and a riser extending from a bottom of the interior surface and including a space between the riser and lateral walls of the planter. A top portion of the riser is configured to receive and support a plant therein.

20 Claims, 6 Drawing Sheets

(56) References Cited

U.S. PATENT DOCUMENTS

| | | | | |
|---|---|---|---|---|
| 3,841,021 A * | 10/1974 | Ferrand | A01G 9/029 | 47/71 |
| 4,991,346 A * | 2/1991 | Costa, Jr. | A01G 27/04 | 47/79 |
| 5,564,226 A * | 10/1996 | Paramest | A01G 9/02 | 47/71 |
| 5,918,414 A * | 7/1999 | Watkins | A01G 9/02 | 47/73 |
| 6,345,470 B1 * | 2/2002 | Slaght | A01G 27/02 | 47/79 |
| 6,370,819 B1 * | 4/2002 | Reiss | A01G 27/06 | 47/79 |
| 6,516,563 B1 * | 2/2003 | Matthews | A01G 9/02 | 47/66.1 |
| 7,000,351 B2 * | 2/2006 | Baumann | A01G 27/04 | 47/32.7 |
| 7,171,783 B1 * | 2/2007 | Fidotti | A01G 27/04 | 47/81 |
| 7,658,034 B1 * | 2/2010 | Dickson | A01G 9/02 | 47/66.1 |
| 2003/0093947 A1 * | 5/2003 | Gilberg | A01G 9/02 | 47/41.01 |
| 2005/0166455 A1 * | 8/2005 | Nishida | A01G 9/02 | 47/79 |
| 2008/0022591 A1 * | 1/2008 | Jung | A01G 9/02 | 47/73 |
| 2009/0199472 A1 * | 8/2009 | Ito | A01G 9/02 | 47/65.6 |
| 2010/0064581 A1 * | 3/2010 | Johnson | A01G 25/167 | 47/79 |
| 2011/0000130 A1 * | 1/2011 | Miller | A01G 9/02 | 47/65.5 |
| 2012/0023819 A1 * | 2/2012 | Marano | A01G 9/02 | 47/65.7 |
| 2012/0233917 A1 * | 9/2012 | Sovey-Strah | A01G 9/02 | 47/66.3 |
| 2013/0067812 A1 * | 3/2013 | Masters | A01G 27/02 | 47/81 |
| 2014/0069006 A1 * | 3/2014 | Nicolay | A01G 9/02 | 47/65.5 |
| 2015/0033625 A1 * | 2/2015 | Jawarski | A01G 27/02 | 47/79 |
| 2015/0068118 A1 * | 3/2015 | Stewart | A01G 9/22 | 47/65.5 |
| 2016/0066522 A1 * | 3/2016 | Walker, II | A01G 27/02 | 47/81 |

* cited by examiner

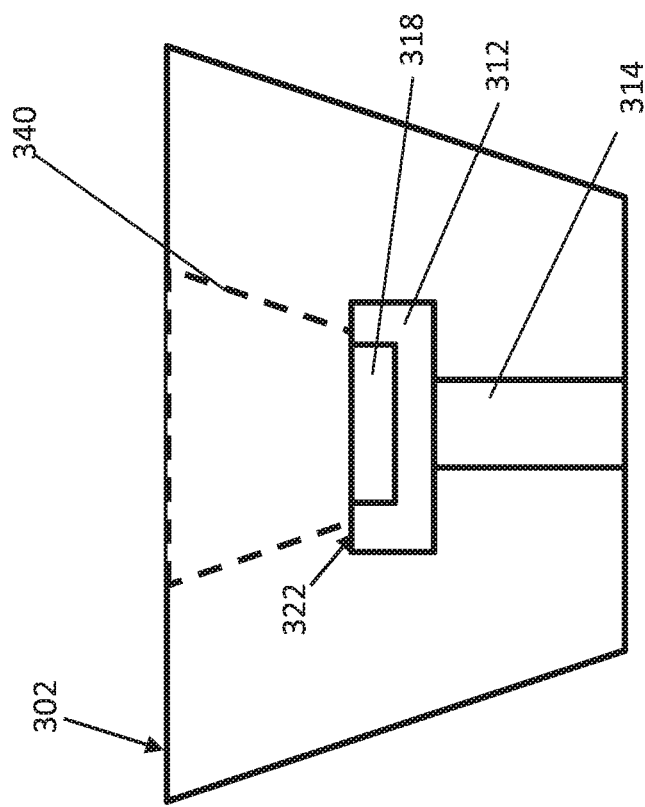
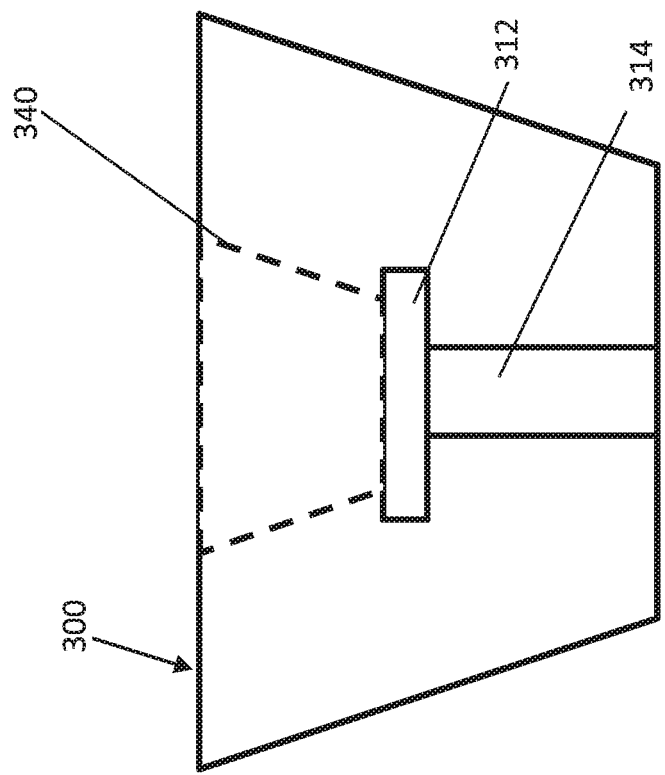

PLANTER WITH ELEVATED INTERNAL PORTION AND WATER PRESERVATION FEATURES

BACKGROUND

Technical Field

The present invention relates to planters, and more particularly to planters having an elevated portion for propping up a smaller planter therein.

Description of the Related Art

Planters provide a decorative element in outside or inside environments. Planters can become cumbersome when the planter itself is large, made from dense materials, like concrete, and is filled with soil, especially wet soil.

SUMMARY

A planter includes an interior surface. A riser extends from a bottom of the interior surface and forms a space between the riser and lateral walls of the planter. A top portion of the riser is configured to receive and support a plant therein.

Another planter includes an interior surface. A riser extends from a bottom of the interior surface and forms a space between the riser and lateral walls of the planter. A reservoir is formed in a top portion of the riser. The top portion is configured to receive and support a plant therein.

A method for water preservation includes providing a planter with an interior surface; a riser extending from a bottom of the interior surface and including a space between the riser and lateral walls of the planter; and a reservoir formed in a top portion of the riser, the top portion being configured to receive and support a pot therein; supporting a plant on the top portion of the riser; and preserving water by storing water in the reservoir and in the spaces between the riser and lateral walls of the planter.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 5 is a partial cross-sectional view of a planter having a columnar riser with a platform that supports a plant in accordance with another embodiment;

FIG. 6 is a partial cross-sectional view of a planter having a columnar riser with a platform having an area above the reservoir that supports a plant in accordance with another embodiment;

DETAILED DESCRIPTION

Figure 2:
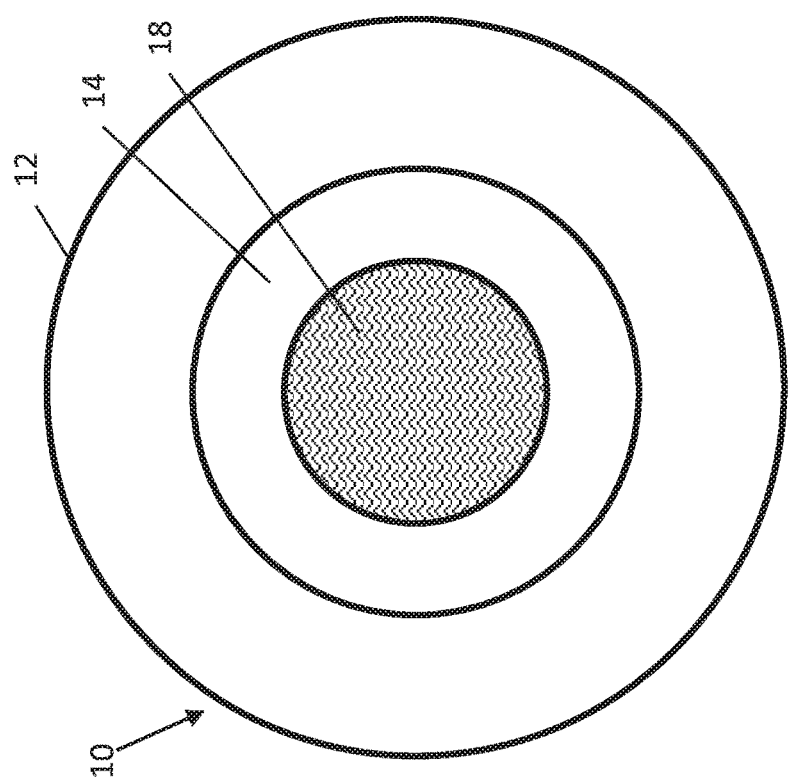
FIG. 2 is a top view of the planter of FIG. 1 showing a reservoir for storing water for a plant supported therein in accordance with one embodiment.

In accordance with the present principles, planters are provided that have a riser (e.g., column or plateau) formed within an interior of the planter to support a smaller planter or a plant. The plateau provides sufficient height for the plant or smaller planter to be visible outside the larger planter. The larger planter may include hollow spaces to reduce the weight of the planter by reducing the amount of soil needed. In useful embodiments, the riser may provide other features to help support and nourish the smaller planter or the plant installed within the larger planter. In one embodiment, a top portion of the riser provides a cupped region or reservoir for storing water. In another embodiment, the riser can be configured to provide a reservoir for water about an internal base of the larger planter.

The planters in accordance with the present principles may be fabricated by molding processes using plastics; however, other materials are contemplated as well. For example, the planters may include metal construction, concrete, wood, etc. In one embodiment, the planters are a monolithic construction (e.g., one piece).

It is to be understood that the present invention will be described in terms of a given illustrative architectures; however, other architectures, structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Figure 1:
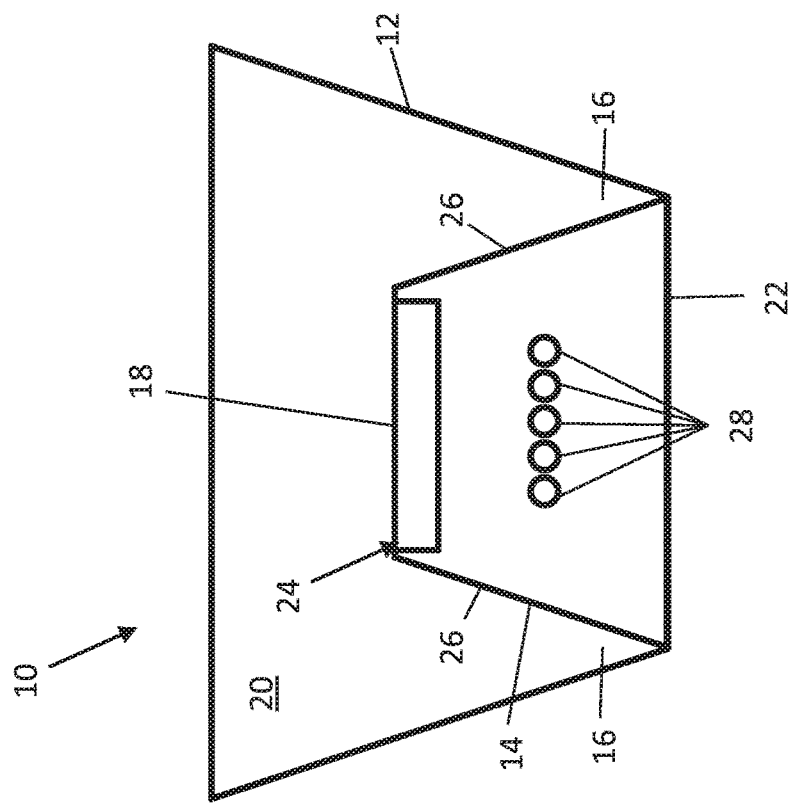
FIG. 1 is a cross-sectional view of a planter having a riser for supporting a plant in accordance with one embodiment.

Referring now to the drawings in which like numerals represent the same or similar elements and initially to FIG. 1, a cross-sectional view of a planter 10 is shown in accordance with the present principles. The planter 10 may include a flower pot or other ornamental container. The planter 10 is illustratively shown having a particular shape; however, it should be understood that the planter 10 may include any shape and may be scaled to any size. The planter 10 includes an external wall 12 that defines an interior space 20. Within the interior space 20, a riser 14 is coupled to a bottom 22 of the planter 10. The riser 14 may be connected to the bottom 22, be connected to the wall 12 or a combination of both. The riser 14 may be solid or hollow and connected to the bottom 22 or function as the bottom or the planter (e.g., integrally formed with the planter). The riser 14 may include holes in sides thereof as needed.

The riser 14 provides an elevated portion or top portion 24, which can be configured to receive a plant or plants, another planter or another object. The top portion 24 may be flat, pitched or may include a reservoir 18. The reservoir 18 can also include a pitched bottom and may have weep holes formed through side walls of the reservoir 18. In use, the reservoir 18 may be filled with water, a water-absorbing medium, gravel, soil or other materials. The reservoir 18 may be configured to receive a bottom of another planter or pot. In this way, the pot can be stably supported when filling the planter 10 with soil or other media or for setting up the planter 10 for other purposes.

The riser 14 may be integrally formed with the other portions of the planter 10. The planter 10 may include formed metal, molded plastic, wood or combinations of these and/or other materials. The riser 14 may include straight, curved or otherwise shaped side walls 26. The side walls 26 form a space 16 between the planter walls 12 and/or the bottom 22. Space 16 is sealed using the walls 26, walls 12 and/or the bottom 22 in some embodiments to trap water therein. The riser 14 reduces the internal space 20 (volume) of the planter 10. In this way, less soil or other media is needed to fill the planter 10. In addition, the space 16 is narrowed so that when the plant in the planter 10 is watered, the water level in the planter rises faster with less water due to the reduced volume. In other embodiments, the riser 14 may include an insert, which can be placed within an existing planter.

In accordance with the present principles, planter 10 preserves water over conventional planters. Water preservation is achieved in a plurality of ways. One way includes catching water in the reservoir 18 so that the water is available at the roots of the plant. Another way includes reducing the space 16 to cause the water level to rise higher with less water so that the water is available closer to the root system of the plant. In conventional planters, water is wasted by dropping to the bottom of the planter and/or draining out of the bottom of the planter. In order to keep the soil moist, a much larger volume of water is needed. In accordance with the present principles, the shape and limited volume of the spacer 16 between the walls 12 of the planters and the walls 26 of the riser 14 store water therein and provide water to a higher position in the planter 10 with less water needed due to the restricted shape of the space 16.

In accordance with one embodiment, riser 14 may optionally include weep holes 28 along its surfaces 26 to limit the water height. The reservoir 18 may also optionally include weep holes (not shown) in its sidewalls (or in its bottom) to limit the water height. The planter 10 may include weep holes (not shown) through the bottom surface 22 or through lateral walls 12 at a height to limit water collection above the weep holes. The bottom surface weep holes can communicate with the weep holes 28. The riser 14 may be hollow, solid or a combination thereof.

Watering the planter 10 needs less water than conventional planters. The amount of water is reduced and the water used to moisten the soil is more efficiently employed. The water savings is greatly enhanced and amplified when considering a large number of planters.

Referring to FIG. 2, a top view of the planter 10 is illustratively shown. The reservoir 18 is depicted as a circular shape; however any suitable shape may be employed, e.g., square, rectangle, triangle, hexagon, etc. In addition, the riser 14 is depicted as a conical shape, but may include a cylindrical shape, a rectangular shape, multiple columns, etc. The planter 10 is also depicted as a circular shape; however any suitable shape may also be employed, e.g., square, rectangle, triangle, hexagon, etc.

Figure 3:
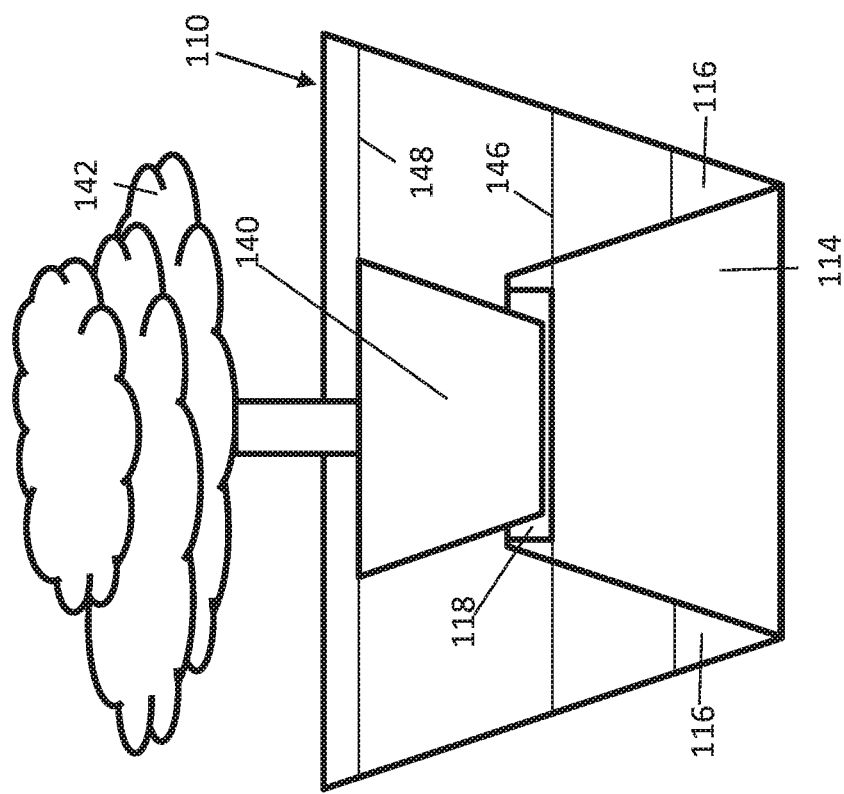
FIG. 3 is a partial cross-sectional view of a planter having a riser with a reservoir that supports a plant in accordance with another embodiment.

Referring to FIG. 3, a planter 110 in accordance with one embodiment is shown having a potted plant 142. The plant 142 grows from a pot 140. The pot 140 may include holes (not shown) through a bottom thereof. The holes in the pot 140 can exchange water present in a reservoir 118 formed in a riser 114. The reservoir 118 may be configured to accommodate standard pot sizes. The plant 142 may be dropped into the planter 110 to create a higher perceived value for the container. The pot 140 may be secured to the planter 110 at the reservoir 118, for example, the reservoir 18 and the pot may include snap fit features, the reservoir 118 may include protrusions that fit into the holes in the pot 140, an adhesive may be employed, etc.

While any level of soil may be employed in the planter 110, the soil level may preferably be between line 146 and line 148. The pot 140 may be completely buried (line 148) or the pot 140 may be completely unburied (line 146). Water settling in areas 116 is available for the plant 142 for any roots that have grown out of the pot 140 without the need to soak an entire volume of water that would otherwise occupy the region beneath the riser 114.

Figure 4:
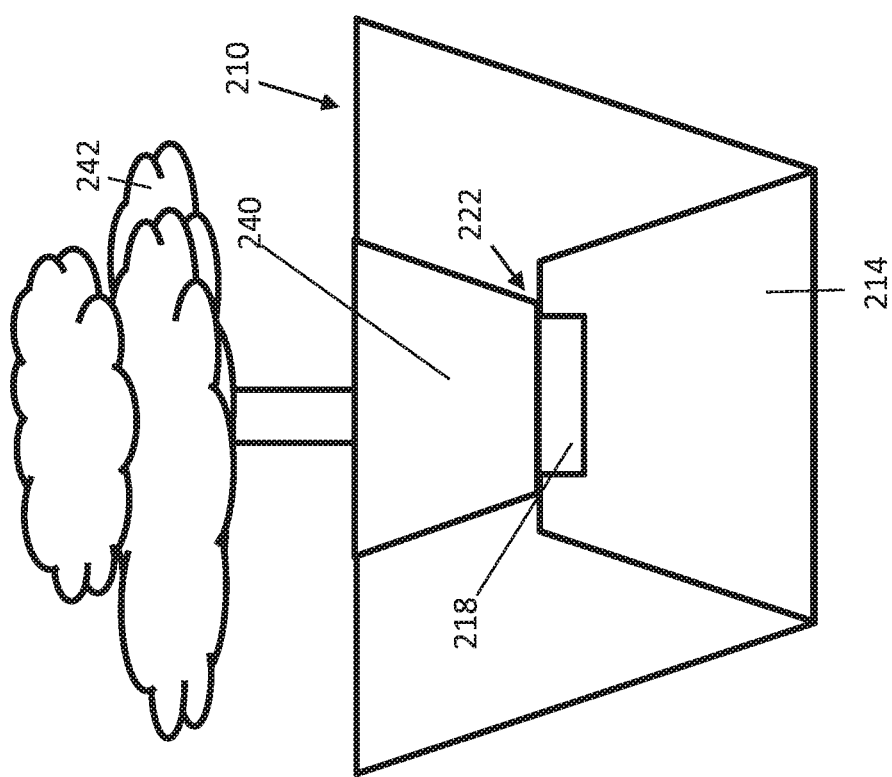
FIG. 4 is a partial cross-sectional view of a planter having a riser with a reservoir and an area above the reservoir that supports a plant in accordance with another embodiment.

Referring to FIG. 4, a planter 210 in accordance with one embodiment is shown having a potted plant 242. The plant 242 grows from a pot 240. The pot 240 may include holes (not shown) through a bottom thereof. The holes in the pot 240 can exchange water present in a reservoir 218 formed in a riser 214. The pot 240 sits on an area 222 over the reservoir 218. The area 222 may be configured to accommodate standard pot sizes. The plant 242 may be dropped into the planter 210 to create a higher perceived value for the container. The pot 240 may be secured to the planter 210 at the area 222 and/or the reservoir 218, for example, the area 222 and the pot 240 may include snap fit features, the area 222 or reservoir 218 may include protrusions that fit into the holes in the pot 240, an adhesive may be employed, etc.

Any level of soil may be employed in the planter 210. The reservoir 218 will not include the pot 240 within it so that the roots are not sitting in the water of the reservoir 218.

Referring to FIG. 5, in alternate embodiments, a riser 314 may include different shapes within a planter 300. As depicted in FIG. 5, the riser 314 includes a column that supports a platform 312. The platform 312 may include a landing or other features to support a pot 340 when introduced.

Referring to FIG. 6, in another embodiment, the riser 314 includes a column that supports a platform 310 in a planter 302. The platform 310 may include a landing or other features to support a pot 340 when introduced. The platform 310 includes a reservoir 318. The pot 340 may include holes (not shown) in a bottom thereof. The holes in the pot 340 can exchange water present in the reservoir 318. The pot 340 sits on the reservoir 318 or an area 322 (like area 222 in FIG. 4) over the reservoir 318. The reservoir 318 or area 322 may be configured to accommodate standard pot sizes. The pot 340 may be secured to the planter 302 at the area 322 and/or the reservoir 318, for example. The reservoir 318 (or area 322) and the pot 340 may include snap fit features, may include protrusions that fit into the holes in the pot 340, may include adhesives, etc.

Figure 7:
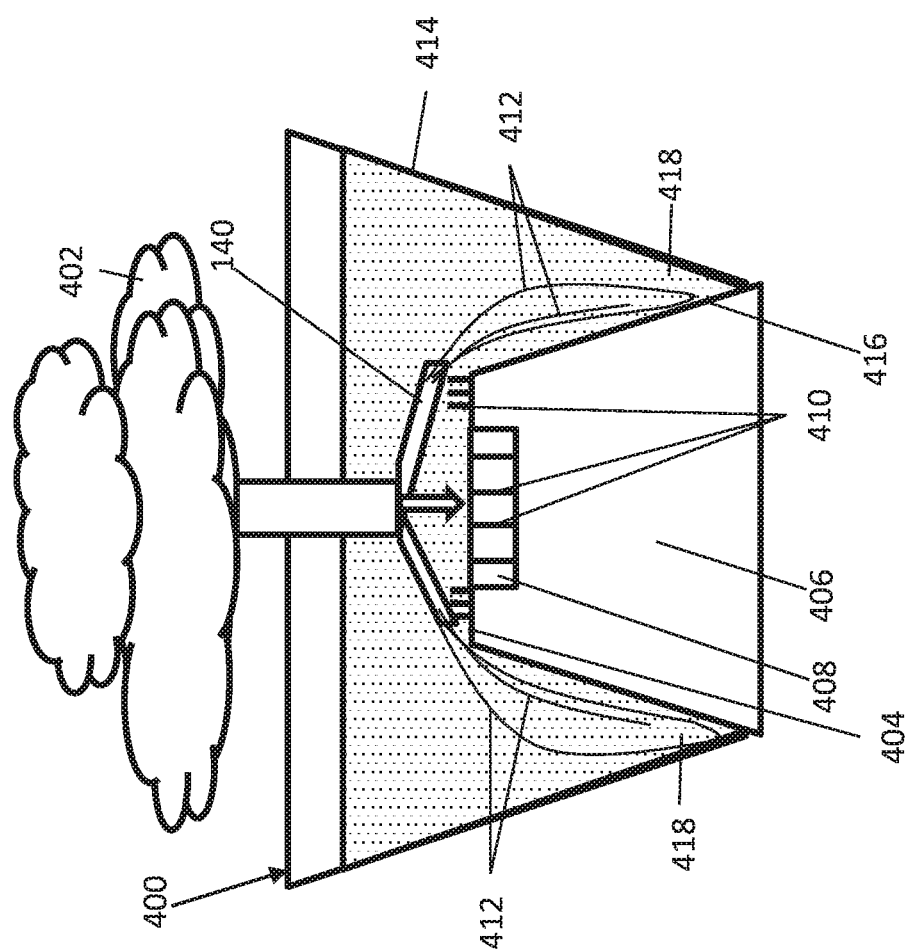
FIG. 7 is a cross-sectional view of a planter having a non-potted plant above a reservoir in a riser that supports the plant and sowing roots reaching water spacers in accordance with another embodiment.

Referring to FIG. 7, any one of the planters shown or described herein may be employed to support a potted plant of a plant without a pot. A planter 400 includes a plant 402 supported by a top portion 404 of a riser 406. The top portion 404 may include a reservoir 408 or features 410 for supporting or stabilizing the plant 402. The plant 402 includes roots 412 that may grow down to spaces 418 between a wall 414 of the planter 400 and a wall 416 of the riser 406. Reservoir 408 can include a mesh or porous media for holding watering and supporting root growth and stabilization.

Figure 8:
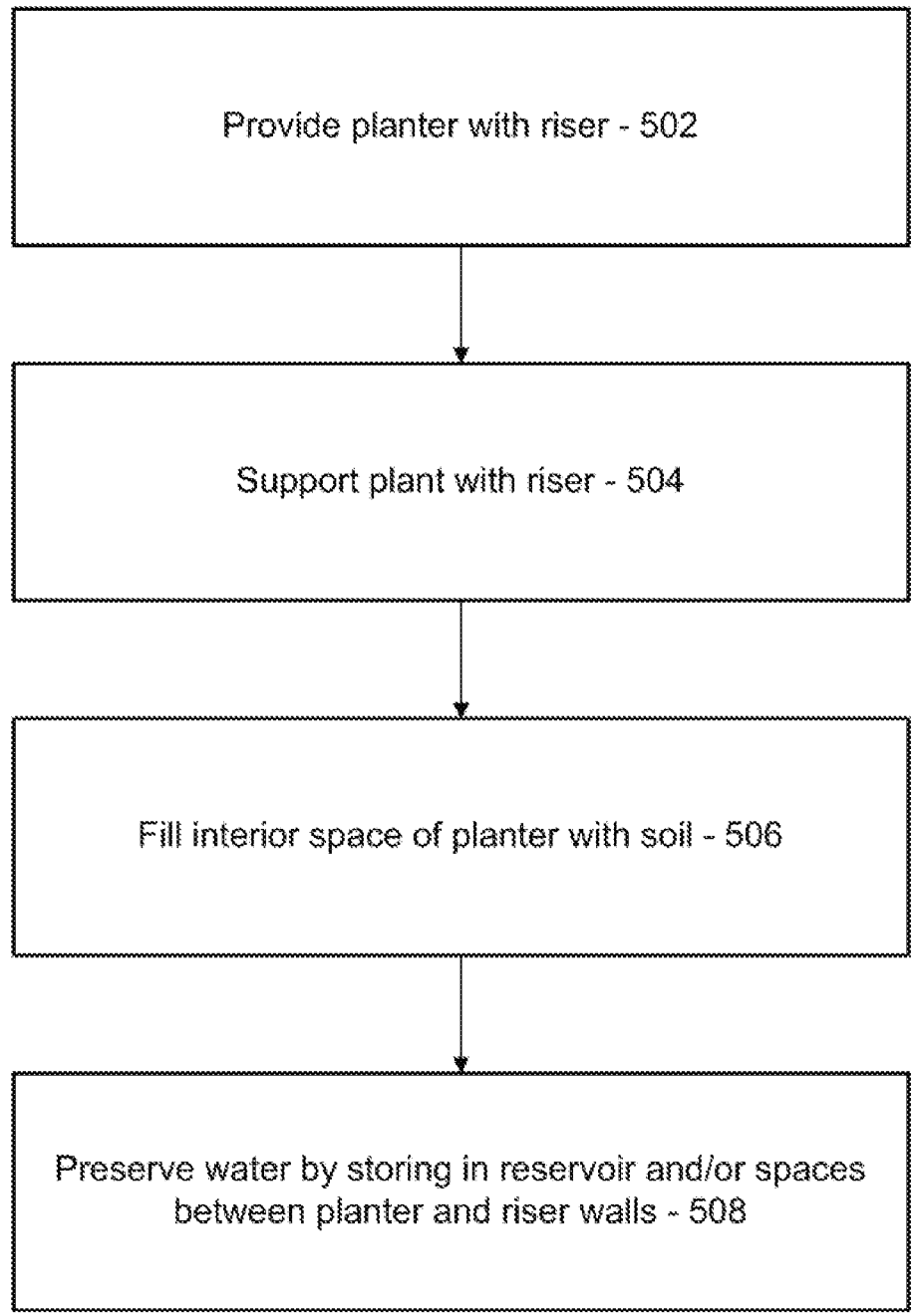
FIG. 8 is a block/flow diagram showing methods for water preservation using planters in accordance with illustrative embodiments.

Referring to FIG. 8, methods for water preservation using a planter are illustratively described and shown in accordance with the present principles. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 502, a planter is provided having an interior surface; a riser extending from a bottom of the interior surface and including a space between the riser and lateral walls of the planter; and a reservoir formed in a top portion of the riser, the top portion being configured to receive and support a pot therein. In block 504, a plant is supported on the top portion of the riser. The plant may be potted or not potted. In block 506, soil or other media may be employed to fill the interior space in the planter. The volume of the riser is not filled. This reduces the amount of soil or other media needed to fill the interior space. In block 508, the plant is watered and water is preserved by storing water in the reservoir (if present) and in the spaces between the riser and lateral walls of the planter.

Figure 9:
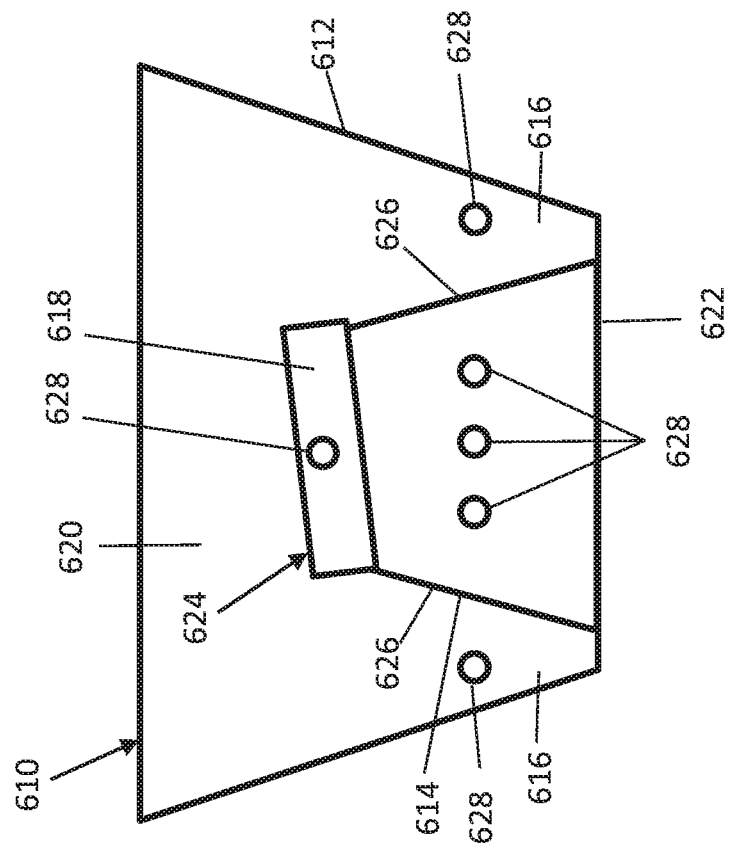
FIG. 9 is a cross-sectional view of another planter having a riser for supporting a plant in accordance with another embodiment.

Referring to FIG. 9, a cross-sectional view of a planter 610 is shown in accordance with another embodiment. The planter 610 may include a flower pot or other ornamental container. The planter 610 is illustratively shown having a particular shape; however, it should be understood that the planter 610 may include any shape and may be scaled to any size. The planter 610 includes an external wall 612 that defines an interior space 620. Within the interior space 620, a riser 614 is coupled to a bottom 622 of the planter 610. The riser 614 may be connected to the bottom 622, be connected to the wall 612 or a combination of both. The riser 614 may be solid or hollow and connected to the bottom 622 or function as the bottom or the planter (e.g., integrally formed with the planter). The riser 614, the lateral walls 612 of the planter 610 and/or the reservoir 618 can have weep holes 628 formed therein.

The riser 614 provides an elevated portion or top portion 624, which can be configured to receive a plant or plants, another planter or another object. The top portion 624 may be flat, pitched or may include a reservoir 618. The reservoir 618 can also include a pitched bottom and may have weep holes formed through side walls of the reservoir 618. In use, the reservoir 618 may be filled with water, a water-absorbing medium, gravel, soil or other materials. The reservoir 618 may be configured to receive a bottom of another planter or pot. In this way, the pot can be stably supported when filling the planter 610 with soil or other media or for setting up the planter 610 for other purposes.

The riser 614 may be integrally formed with the other portions of the planter 610. The planter 610 may include formed metal, molded plastic, wood or combinations of these and/or other materials. The riser 614 may include straight, curved or otherwise shaped side walls 626. The side walls 626 form a space 616 between the planter walls 612 and/or the bottom 622. Space 616 is sealed using the walls 626, walls 612 and/or the bottom 622 in some embodiments to trap water therein (e.g., functions as a reservoir). The riser 614 reduces the internal space 620 (volume) of the planter 610. In this way, less soil or other media is needed to fill the planter 610. In addition, the space 616 is narrowed so that when the plant in the planter 610 is watered, the water level in the planter rises faster with less water due to the reduced volume (e.g., due to the inverted space distribution of the space 616). In other embodiments, the riser 614 may include an insert, which can be placed within an existing planter.

In accordance with the present principles, planter 610 preserves water over conventional planters. Water preservation is achieved in a plurality of ways. One way includes catching water in the reservoir 618 so that the water is available at the roots of the plant. Another way includes reducing the space 616 to cause the water level to rise higher with less water so that the water is available closer to the root system of the plant. In conventional planters, water is wasted by dropping to the bottom of the planter and/or draining out of the bottom of the planter. In order to keep the soil moist, a much larger volume of water is needed. In accordance with the present principles, the shape and limited volume of the spacer 616 between the walls 612 of the planters and the walls 626 of the riser 614 store water therein and provide water to a higher position in the planter 610 with less water needed due to the restricted shape of the space 616.

In accordance with one embodiment, riser 614 may optionally include weep holes 628 along its surfaces 626 to limit the water height. The reservoir 618 may also optionally include weep holes 628 in its sidewalls (or in its bottom) to limit the water height. The planter 610 may include weep holes 628 through the bottom surface 622 or through lateral walls 612 at a height to limit water collection above the weep holes. The bottom surface weep holes can communicate with the weep holes 628. The riser 614 may be hollow, solid or a combination thereof.

Watering the planter 610 needs less water than conventional planters. The amount of water is reduced and the water used to moisten the soil is more efficiently employed. The water savings is greatly enhanced and amplified when considering a large number of planters.

In some embodiments, the reservoir or the top portion of the riser is pitched to control water flow and to control the location of stored water. In one embodiment, the space 616 can be asymmetrical or include additional reservoirs (within the space 616) to permit water added to the planter to be distributed unevenly.

It should be understood that the elements depicted in the FIGS. can be mixed in different combinations to provide the desired functionality. For example, weep holes can be formed in one or more of the reservoir, the walls of the planter, walls of the riser, etc. In addition, the shape or configuration of the riser and the planter can be different. For example, the riser can have a square shape while the planter is circular, etc.

Having described preferred embodiments for planters with elevated internal portion and water preservation features (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is desired to be protected by Letters Patent is set forth.

What is claimed is:

1. A planter, comprising:
   an interior surface;
   an integrated riser extending from a bottom of the interior surface and including a space between the integrated riser and lateral walls of the planter, the integrated riser being configured to be surrounded by and buried underneath soil; and
   an open-top reservoir formed in a top portion of the integrated riser and including upwardly extended walls and a solid bottom portion, the top portion being configured to receive and support a plant therein.

2. The planter as recited in claim 1, wherein the space is configured to trap water between the integrated riser and the lateral walls of the planter.

3. The planter as recited in claim 2, where the space is configured to trap water between the integrated riser, the lateral walls and the bottom of the planter.

4. The planter as recited in claim 1, further comprising weep holes through walls of the integrated riser.

5. The planter as recited in claim 4, wherein the weep holes are placed at a height to prevent water collection above the height.

6. The planter as recited in claim 1, further comprising weep holes through the lateral walls of the planter.

7. The planter as recited in claim 6, wherein the weep holes are placed at a height to prevent water collection above the height.

8. The planter as recited in claim 1, wherein the top portion of the reservoir is pitched.

9. The planter as recited in claim 1, wherein the reservoir is configured to receive and support a pot therein.

10. The planter as recited in claim 1, wherein the reservoir is configured to fill with one of water or a water-absorbing medium.

11. The planter as recited in claim 1, wherein the reservoir is formed in a platform and the integrated riser includes a column.

12. A planter, comprising:
    an interior surface;
    an integrated riser extending from a bottom of the interior surface and including a space between the integrated riser and lateral walls of the planter, the integrated riser being configured to be surrounded by and buried underneath soil; and
    a top portion of the integrated riser, the top portion including an open-top reservoir with upwardly extended walls and a solid bottom portion being configured to receive and support a plant pot therein.

13. The planter as recited in claim 12, wherein the space is configured to trap water between the integrated riser and the lateral walls of the planter.

14. The planter as recited in claim 13, where the space is configured to trap water between the integrated riser, the lateral walls and the bottom of the planter.

15. The planter as recited in claim 12, further comprising weep holes through walls of the integrated riser, wherein the weep holes are placed at a height to prevent water collection above the height.

16. The planter as recited in claim 15, wherein the bottom portion of the reservoir is positioned at a pitched angle with respect to the integrated riser.

17. The planter as recited in claim 16, wherein the reservoir is configured to fill with one of water or a water-absorbing medium.

18. The planter as recited in claim 16, wherein the reservoir is formed in a platform and the integrated riser includes a column.

19. A method for water preservation, comprising:
providing a planter with an interior surface, an integrated riser extending from a bottom of the interior surface and including a space between the integrated riser and lateral walls of the planter, the integrated riser being configured to be surrounded by and buried underneath soil, and an open-top reservoir formed in a top portion of the integrated riser and including upwardly extended walls and a solid bottom portion, the top portion being configured to receive and support a pot therein;
supporting a plant on the top portion of the integrated riser; and
preserving water by storing water in the reservoir and in the spaces between the integrated riser and lateral walls of the planter.

20. The method as recited in claim 19, further comprising weep holes through walls of the integrated riser at a height and preventing water collection above the height using the weep holes.

* * * * *